June 6, 1944.  S. C. COEY  2,350,591
EVAPORATIVE COOLING
Filed July 3, 1942  2 Sheets-Sheet 1

INVENTOR
Stewart C. Coey
BY
Pierce & Scheffler
ATTORNEYS

June 6, 1944. S. C. COEY 2,350,591
EVAPORATIVE COOLING
Filed July 3, 1942 2 Sheets-Sheet 2

Inventor:
Stewart C. Coey
By Pierce & Scheffler
Attorneys.

Patented June 6, 1944

2,350,591

UNITED STATES PATENT OFFICE 2,350,591

EVAPORATIVE COOLING

Stewart C. Coey, Glen Ridge, N. J., assignor to Research Corporation, New York, N. Y., a corporation of New York Application July 3, 1942, Serial No. 449,649

2 Claims. (Cl. 261—111)

This invention relates to apparatus for the efficient and economical contacting of gases and liquids. The invention is particularly suitable for the cooling of water by the evaporative cooling effect of a current of air or other gas having a substantial capacity for evaporation of the water and the advantages of the invention will be more particularly described with reference to such evaporative cooling.

It has been recognized that efficient cooling of water by the evaporative cooling effect of a current of air requires that a large surface of the water be exposed to contact with the air and it has also been recognized that to obtain the greatest possible degree of cooling, that is, to cool the water to a temperature approaching the wet bulb temperature of the available air, the flow of air and water should be countercurrent, so that the warmest water contacts the most nearly saturated air and the water of lowest temperature is contacted with air of lowest wet bulb temperature. While a large extent of contact surface may readily be provided by subdividing the water into droplets, as by spray devices, it has been found that the greater the extent of subdivision the more difficult it becomes to maintain counter-current flow of air and water, as the fine droplets of water are carried along with the air stream. In order to avoid this difficulty, evaporative cooling methods and devices have hitherto relied largely upon the use of extended solid surfaces such as perforated sheets and packing materials over which the water was caused to flow downward in contact with a generally upward current of air. These methods and devices have the serious drawback of introducing a substantial resistance to the flow of air, thereby entailing a loss of pressure or the necessity for blowers of increased cost and power consumption for maintaining the flow of air. Moreover, the substantial loss of head in passing through the apparatus very definitely limited the length of the path of contact as when a definite length of path is exceeded the air pressures at the air supply end of the apparatus become too large to be withstood by any economical construction. In addition, the air velocities in apparatus of this character must be kept at a relatively low figure to prevent "channeling" and local or general blowing of the liquid off the surface of the packing material. This limitation very greatly reduces the space efficiency of the apparatus.

It has been found that, at a certain range of air velocities, an upward stream of air will disperse a downward stream of water in contact therewith into droplets which for at least a substantial period of time will be in equilibrium with the force of gravity and which will therefore float at a substantial constant position in the air stream. This balancing of the dispersing and the buoyant action of the air stream occurs at air velocities of the order of 1300 feet per minute which may be referred to as "equilibrium velocities." It has been further found that by deflecting the direction of flow of the air stream from the vertical so as to give it a horizontal component while maintaining the velocity at substantially equilibrium velocity, the water particles tend to float across said air stream in the direction of deflection, so that if the stream of water is supplied to the deflected air stream, for example, at a lateral boundary thereof, it will be dispersed into droplets which float across the air stream and are deposited across the air stream substantially at the level at which the water was supplied. Utilizing these phenomena it has been found that a very close approach to the theoretical degree of cooling can be obtained with a very low pressure drop of the air and a very high space efficiency by passing a stream of water generally downwardly through a generally upward stream of air in a succession of lateral paths in the same or alternating directions across the air stream, the air stream being maintained at a velocity of from about 1100 to about 1500 feet per minute and being deflected from its vertical upward direction in the zone including said lateral paths. For example, the air stream may be deflected continuously throughout a plurality of zones of successive contact paths, wherein the water is successively dispersed in the air stream, transported laterally across the air stream and redeposited at the opposite boundary of the air stream, or the air stream may be deflected at a plurality of levels at alternate boundaries of the stream to provide a plurality of successive zones of alternating divergence from vertical flow, in each of which the stream of water is successively dispersed in the air stream, transported laterally across the air stream and redeposited at the opposite boundary of the air stream.

In each zone defined by such lateral passage the stream of water tends to approach the wet bulb temperature of the air in said zone due to the sustained, extended surface contact of the air and water stream during the lateral passage.

In order to obtain an effective dispersion and lateral transportation of the water across the air stream without excessive transfer of dispersed water particles directly from one zone of contact to a higher zone, it is desirable that the water stream be supplied in the proportion of at least 3 gallons to each 1000 cubic feet of air, and preferably in the range of from 5 gallons to 12.5 gallons per 1000 cubic feet of air. Greater proportions of water can be effectively dispersed by the method of the invention, but the efficiency of heat exchange between air and water is substantially decreased at proportions over 12.5 gallons per 1000 cubic feet of air as well as below 5 gallons per 1000 cubic feet of air, the optimum proportion for normal operating conditions being about 8¾ gallons per 1000 cubic feet of air.

The apparatus of the invention comprises, in general, a conduit defining a substantially unobstructed rectilinear path for the flow of gas in a generally upward direction through at least one zone of divergence from the vertical, means for successively introducing a stream of liquid into the conduit at an upper lateral boundary of a zone of divergence, collecting the liquid at the opposite boundary of said conduit and reintroducing the collected liquid into the conduit at an upper lateral boundary of a zone of divergence at a level lower than the level of collection. The term "substantially unobstructed rectilinear path" is intended to define a path in which straight line flow of gas through at least two successive stages of gas and liquid contact is possible and is intended to distinguish the apparatus of the invention from apparatus in which the gas is forced, by packing or other overlapping obstructions, to follow a tortuous path of flow through the contact zone.

The deflection of the air stream may advantageously be effected by means of vanes or other members projecting horizontally into the air stream, said members likewise forming, or forming a portion of, collecting and redistributing means for the water deposited from the air stream above said members. The deflection of the air stream may also be effected, in whole or in part, by the action of the stream of water supplied at a lateral boundary of the air stream with a substantial horizontal component.

The invention will be more particularly described for the purpose of illustration with reference to the accompanying drawings showing cooling towers embodying the principles of the invention.

Figure 1:
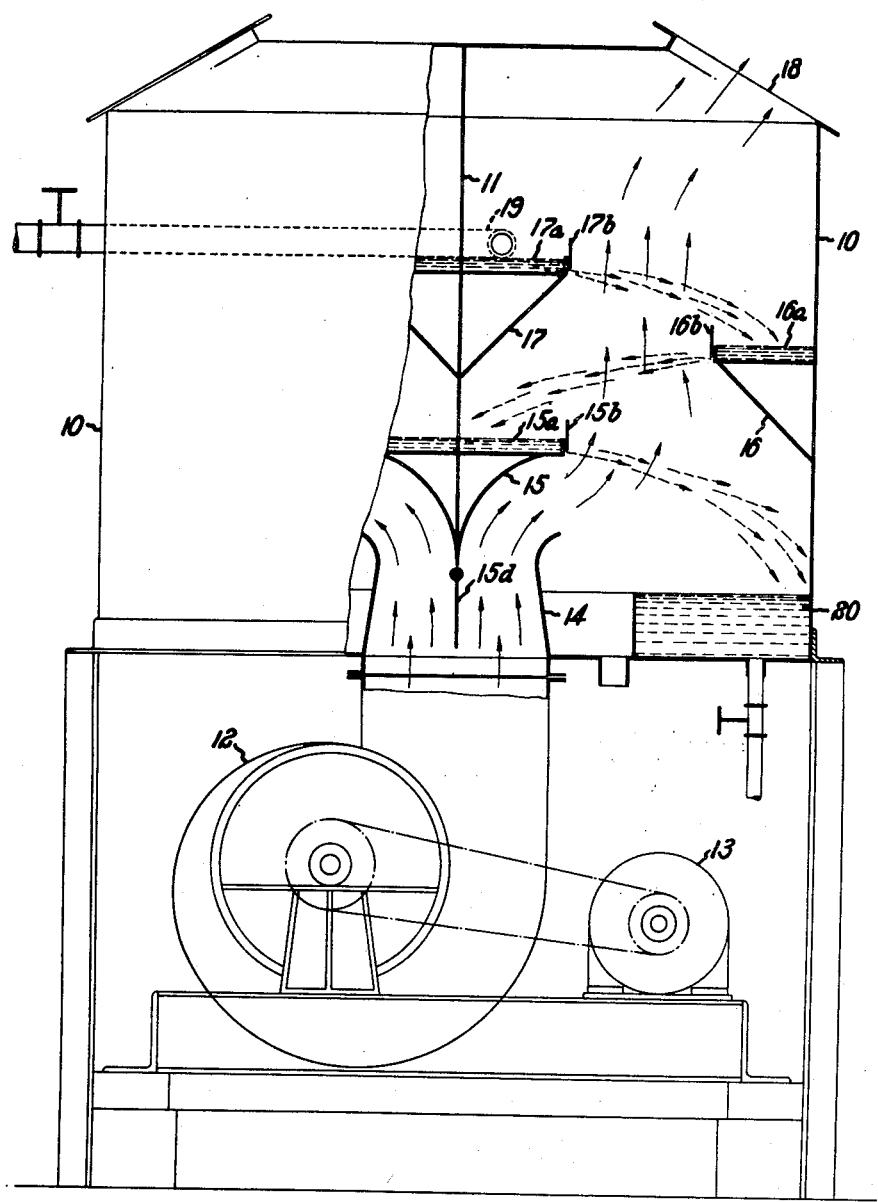
Fig. 1 is a diagrammatic elevation in partial section of a rectangular cooling tower.

In Fig. 1, 10 is the walls of a rectangular tower, divided into two vertical sections by central partition 11. A stream of air is blown vertically upward through the tower by means of centrifugal fan 12 driven by motor 13. The air stream from the fan entering the lower central portion of the tower through pipe 14 is diverted into the two vertical sections by vane 15d which is adjustably positioned in pipe 14.

Referring to the right-hand section of the tower as shown in the drawing, the air stream is alternately diverted to the right and left in passing upward through the tower by guide members 15, 16, 17, and finally leaves the tower through outlet 18.

A stream of water to be cooled is supplied to sump 17a, by pipe 19, and flows through gate 17b into the air stream adjacent the uppermost deflection level. The water is dispersed in the air stream, and as a result of the combined buoyant effect and lateral component of the air stream the water particles "float" laterally to the right and are collected in sump 16a. The water then returns to the air stream through gate 16b and passes laterally across the air stream in the opposite direction to be collected in sump 15a.

The water from sump 15a passes into the air stream again through gate 15b and again floats in dispersed particles across the air stream to be collected in bottom sump 20.

It will be seen that in the apparatus of the invention the stream of water to be cooled is caused to traverse a generally upward flowing air stream in a succession of sustained passages of high contact surface. While the closeness of approach of the water temperature to the wet bulb temperature of the available air increases with increasing number of contact zones, in general, an economic optimum for a cooling range of 15° to 20° F. will be attained with from three to eight contact zones.

The effectiveness of the distribution of the water stream in the contact zones and of its redeposition from the air stream before the air stream passes into the next upward zone may be increased by constricting the path of flow of the air stream adjacent to the point of deflection so as to provide a somewhat greater air velocity at the point of dispersal of the water stream than at the point of deposition. As will appear from the drawing, this constriction is readily brought about by the suitable position of the members provided for deflecting the air stream or introducing the water stream thereinto.

Figure 2:
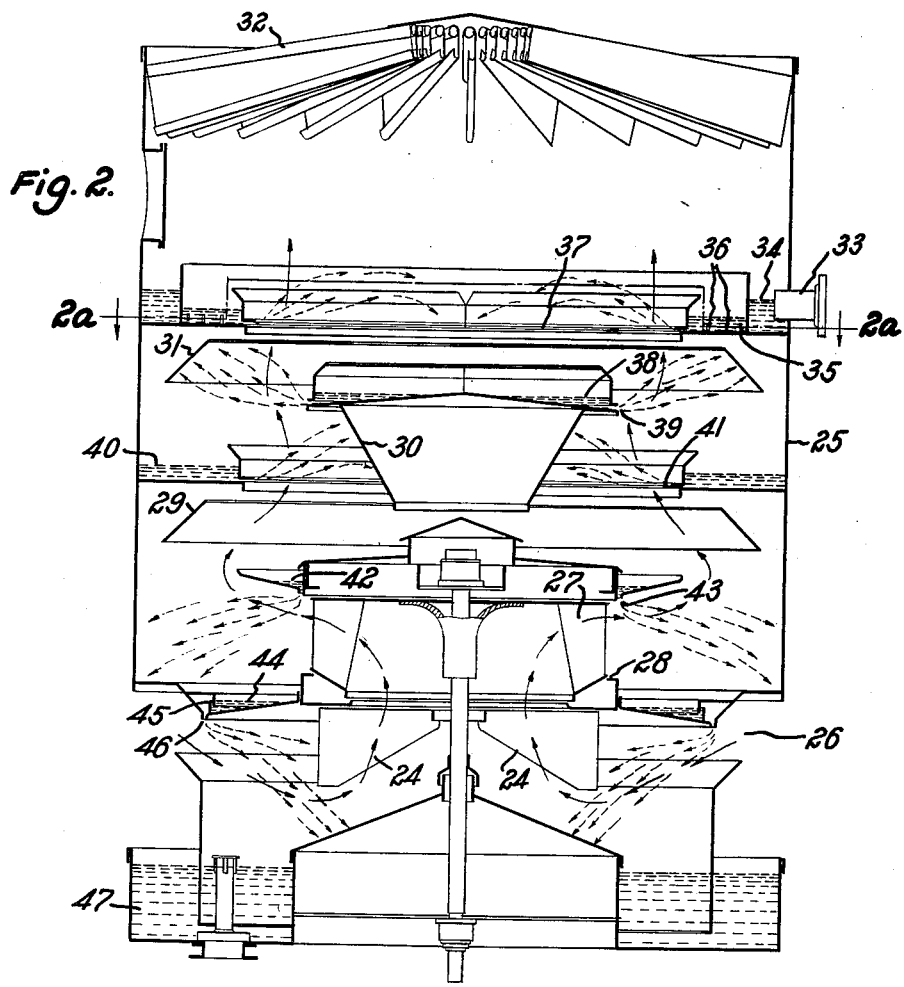
Fig. 2 is a diagrammatic sectional elevation of a circular cooling tower.
Figure 2A:
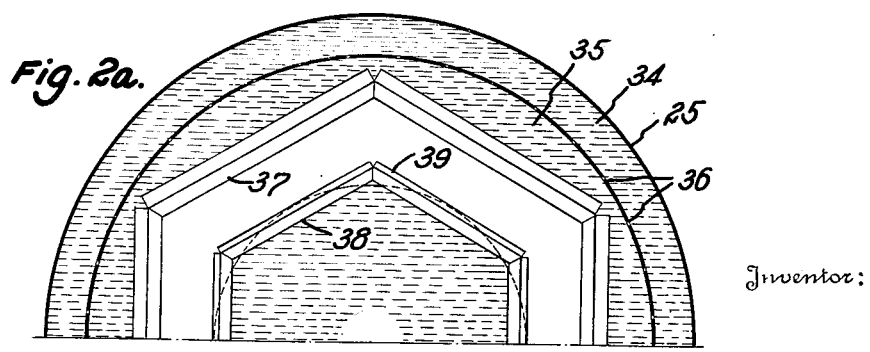
Fig. 2a is a horizontal section on line 2a—2a of Fig. 2.

The cooling tower of Figs. 2 and 2a is generally similar in principle to that of Fig. 1, differing mainly in providing a larger number of contact zones and in utilizing annular air and water streams. In the figure 25 is the circular outer wall of the cooling tower. A stream of air drawn into the base of the tower through annular inlet 26 by means of squirrel cage fan 27 vertically mounted in the lower central portion of the tower is blown outward through opening 28 in an annular stream which is successively deflected horizontally in passing upward through the tower by deflector elements 29, 30, 31, and passes out of the tower through spray eliminator 32. Guide vanes 24 prevent whirling of the entering air.

The stream of water to be cooled is fed to annular distributing basin 34 by pipe 33 and flows from basin 34 into feed trough 35 through slots 36. From trough 35 the water flows through slot 37 into the air stream where it is dispersed into droplets which float inwardly across the air stream and are deposited in basin 38 from which it is returned to the air stream through slot 39, is redispersed, transported outwardly across the air stream, deposited in annular basin 40, returned again to the air stream through slot 41, and recollected in basin 42. This is the lower end of the rectilinear air path of the invention in the tower illustrated in Fig. 2. The water in basin 42 is fed through slot 43 into the air stream issuing from fan 27, wherein it is dispersed and redeposited in annular basin 44, from which it is fed through trap 45 and slot 46 into the air stream entering the tower through inlet 26. The cooled water stream is finally collected in sump 47.

In Figs. 1 and 2 the solid arrows indicate the path of the gases flowing through the apparatus, and the dotted arrows indicate the path of the liquid spray.

While the apparatus of the invention has been particularly described for the purpose of illustration with reference to the cooling of water by evaporative contact with an air stream, the advantages of the invention are generally available in methods and apparatus involving the contacting of gases and liquids, such as gas washing and cooling, gaseous carrier stream evaporation, humidification and dehumidification of gases and the like.

This application is a continuation-in-part of my application Serial Number 384,403, filed March 20, 1941.

I claim:

1. Apparatus for contacting gases and liquids comprising means defining a vertical conduit for the flow of gas, fan means for providing a generally upward stream of gas through said conduit, members projecting into said conduit at a plurality of levels alternately from opposite sides of said conduit and each terminating substantially short of the members that project from the opposite side to provide a rectilinearly unobstructed vertical passage of substantial width through said conduit between said members whereby to impart successive oppositely directed horizontal components of flow to said gas stream while maintaining the major upward vertical component of flow thereof, means for supplying a stream of liquid to the upper portion of said passage, liquid collecting means immediately above each of said projecting members including means for reintroducing collected liquid into said gas stream, and means for collecting said liquid at the lower end of said conduit.

2. Apparatus for contacting gases and liquids comprising means defining a vertical, annular conduit for the flow of gas, fan means for providing a generally upward stream of gas through said conduit, members projecting into said conduit at a plurality of levels alternately from the inner and outer boundaries of the annular conduit and each terminating substantially short of the members that project from the opposite boundary to provide a rectilinearly unobstructed vertical annular passage of substantial width through said conduit between said members whereby to impart successive oppositely directed horizontal components of flow to said gas stream while maintaining the major upward vertical component of flow thereof, means for supplying a stream of liquid to the upper portion of said passage, liquid collecting means immediately above each of said projecting members including means for reintroducing collected liquid into said gas stream, and means for collecting said liquid at the lower end of said conduit.

STEWART C. COEY.